A. H. HOWE.
Pole and Shaft.
No. 70,848. Patented Nov. 12, 1867.
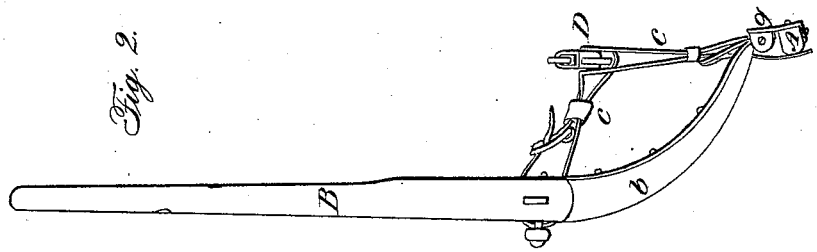
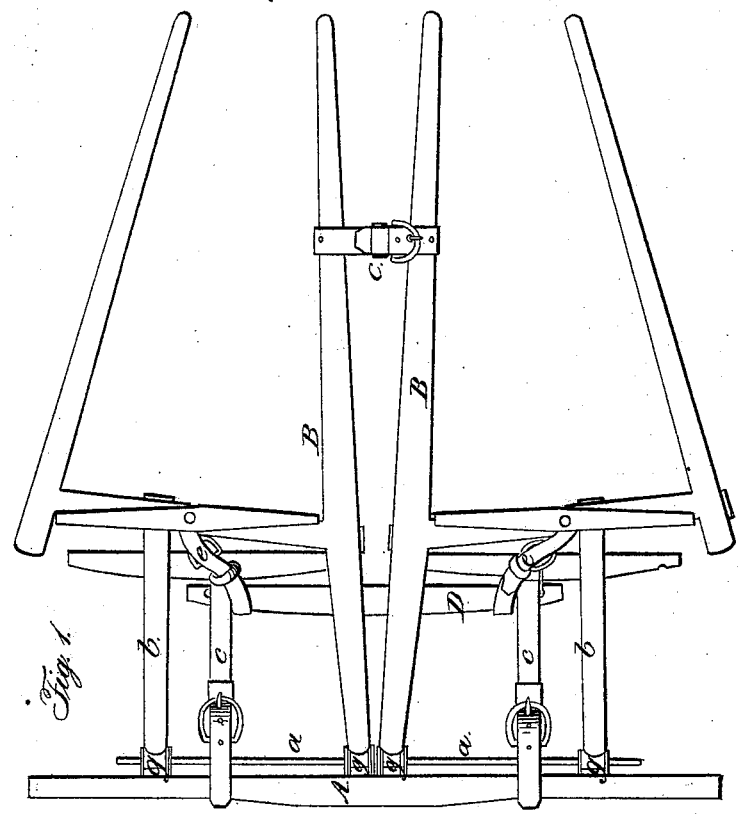
Witnesses:
A. M. Marr
V. D. Stockbridge
Inventor:
A. H. Howe
Alexander Mason
Atty.

UNITED STATES PATENT OFFICE.

ARAH H. HOWE, OF BROOKFIELD, VERMONT.

IMPROVEMENT IN SELF-ADJUSTING THILLS.

Specification forming part of Letters Patent No. 70,848, dated November 12, 1867.

*To all whom it may concern:*

Be it known that I, ARAH H. HOWE, of Brookfield, in the county of Orange and in the State of Vermont, have invented certain new and useful Improvements in Independent Two-Horse Self-Adjusting Shafts; and do hereby declare that the following is a full, clear, and exact description thereof, reference being had to the accompanying drawings and to the letters of reference marked thereon, making a part of this specification.

My invention has for its objects the dispensing of the neck-yoke, "pole," and pole-strap, and to allow each horse to carry his own shafts and weight independently; also, to give the horses more ease in going down a hill; also, obviating the difficulty now experienced by the pole of wagon running into the rear end of a preceding vehicle.

In the annexed drawings, A represents the axle-tree of a wagon, to which I attach two pairs, B B, of ordinary buggy-shafts, with the single exception, that the outside curved shaft extends only to the horizontal brace, and the short curved bar $b$ is connected to the brace and to the axle-tree, as seen in Fig. 1 of the annexed drawings. This change in the shafts is made to prevent the shafts striking the wheel, or being otherwise in the road when turning or otherwise moving. The ends of these shafts are connected to the axle by suitable couplings $g\ g$, through which couplings are passed metallic rods $a\ a$ for connecting the low-draft whiffletree, to be hereinafter described.

C represents a leather strap and buckle, which is clasped around the forward part of the shafts, and connects them, so that when one horse is being harnessed the other shaft will be slightly elevated from the ground, and prevent accident, should the hitching horse happen to start prematurely. D represents the low-draft whiffletree, which is connected to the rods $a\ a$ by straps $c\ c$, with buckles, and additionally connected by means of straps and buckles $e\ e$, which are attached to the braces and single-trees of the shafts B B, and extend to the whiffletree D, so that the height can be regulated by these straps.

This low-draft whiffletree is only intended to be used in hauling heavy weights, and is dispensed with in the ordinary buggies and light wagons.

The arrangement herein described will be found very beneficial in the training of young horses, and used without danger to the driver or the vehicle.

Having thus fully described my invention, what I claim as new, and desire to secure by Letters Patent, is—

1. The independent shafts B B, connected together by the strap C, and to the axle A, by means of the rod $a$, whereby one of said shafts may be used independent of the other, as specified.

2. The arrangement of the shafts B B, low-draft whiffletree D, rods $a\ a$, and connecting-straps, in the manner substantially as and for the purposes set forth.

In testimony that I claim the foregoing I have hereunto set my hand this 26th day of March, 1867.

ARAH HOWARD HOWE.

Witnesses:
SAML. DAVIS,
JOHN A. SMITH.